US007366816B2

(12) United States Patent
Rai

(10) Patent No.: US 7,366,816 B2
(45) Date of Patent: Apr. 29, 2008

(54) METHOD AND APPARATUS FOR ADAPTIVELY ADJUSTING THE BANDWIDTH OF A DATA TRANSMISSION CHANNEL HAVING MULTIPLE BUFFERED PATHS

(75) Inventor: Barinder Singh Rai, Surrey (CA)

(73) Assignee: Seiko Epson Corporation, Tokyo (JP)

( * ) Notice: Subject to any disclaimer, the term of this patent is extended or adjusted under 35 U.S.C. 154(b) by 93 days.

(21) Appl. No.: 11/146,506

(22) Filed: Jun. 7, 2005

(65) Prior Publication Data

US 2005/0283634 A1 Dec. 22, 2005

(51) Int. Cl.
*G06F 13/40* (2006.01)
*G06F 13/36* (2006.01)

(52) U.S. Cl. .................................................... 710/307

(58) Field of Classification Search ................ 375/240; 710/310

See application file for complete search history.

(56) References Cited

U.S. PATENT DOCUMENTS 4,998,246 A * 3/1991 Tanaka ....................... 370/452
5,191,436 A * 3/1993 Yonemitsu ................... 386/52
5,809,538 A 9/1998 Pollmann et al.
6,012,109 A 1/2000 Schultz
6,105,086 A * 8/2000 Doolittle et al. .............. 710/52
6,330,647 B1 12/2001 Jeddeloh et al.
6,366,325 B1 4/2002 Wang
6,563,506 B1 5/2003 Wang
6,662,278 B1 12/2003 Kahn et al.
6,720,968 B1 4/2004 Butler et al.
6,912,612 B2 * 6/2005 Kapur et al. ................ 710/309
7,016,303 B1 * 3/2006 Sakamoto et al. .......... 370/235
7,047,374 B2 * 5/2006 Sah et al. ................... 711/158
2003/0147634 A1 8/2003 Takezawa et al.
2003/0163619 A1 * 8/2003 Saito ........................... 710/56
2004/0128437 A1 7/2004 Regev et al.
2004/0263427 A1 * 12/2004 Horigan ...................... 345/3.1

* cited by examiner

*Primary Examiner*—Rehana Perveen
*Assistant Examiner*—Mohammed H Rehman
(74) *Attorney, Agent, or Firm*—Mark P. Watson

(57) ABSTRACT

A method and apparatus for adaptively adjusting the bandwidth of a data transmission channel having multiple buffered paths. Each output path includes a buffer for holding respective portions of the data. A value representative of at least the number of buffers that are nearly empty of data as compared to a predetermined threshold is determined, and the transmission rate of the input path is adjusted according to the value. Preferably, the buffers are display pipes provided in a graphics controller IC for interfacing between one or more hosts and a graphics display device.

22 Claims, 2 Drawing Sheets

METHOD AND APPARATUS FOR ADAPTIVELY ADJUSTING THE BANDWIDTH OF A DATA TRANSMISSION CHANNEL HAVING MULTIPLE BUFFERED PATHS

FIELD OF THE INVENTION

The invention relates to a method and apparatus for adaptively adjusting the bandwidth of a data transmission channel having multiple buffered paths. The invention is particularly well suited for adjusting the bandwidth of such a data transmission channel within a graphics controller that internally transmits image data corresponding to multiple windows over multiple display pipes for provision to a graphics display device.

BACKGROUND

Graphics display systems, such as cellular telephones, typically employ a graphics controller as an interface between one or more providers of image data and a graphics display device such as an LCD panel or panels. In a cellular telephone, the providers of image data are typically a host processor (CPU) and a camera (any and all such providers hereinafter being generally considered a "host").

The image data are transmitted from a host to the graphics controller where the data are stored in a memory. The image data typically correspond to different "windows" for display by the display device. For example, one host, such as the CPU, may provide a "main window" for displaying associated main window image data and another host, such as the camera, may provide a "sub-window" for displaying associated sub-window image data that overlay the main window data. An artifact known as a "sprite" may also be provided. A typical example of a "sprite" is the cursor provided by the CPU. The "sprite" typically overlays both the main and sub-window image data.

The image data corresponding to the windows are typically fetched from the memory and transmitted or clocked through respective FIFO ("first-in-first out") buffers or "display pipes" to a selecting circuit. The selecting circuit selects the image data, on a pixel-by-pixel basis, from one of the pipes for further transmission to the display device. For example, for a pixel located at a particular row and column on the display falling within a sub-window that overlays a main window, but which is not overlaid by a sprite, the selecting circuit selects the image data at the end of the display pipe for the sub-window and does not select the image data at the end of the display pipes corresponding to either the main window or the sprite.

The display pipes provide a buffering function that is advantageous because the rate at which image data may be fetched from the memory is typically higher than the rate at which the image data are clocked out to the display device. From this it can be seen that the memory may fill the display pipe relatively quickly, and while the display pipe is being emptied relatively slowly, the memory is freed for alternative uses. A "near-empty" signal is generated when the display pipe is nearly empty, which is used to trigger the memory accesses needed to refill the display pipe. It may be noted that the rate at which data are transmitted through the display pipe is often referred to as the "bandwidth" of the display pipe. The concept applies to other channels of data transmission as well, and can even apply to analog transmission channels.

The rate at which image data are introduced into or fill the display pipe is determined by the (clock) rate at which memory may be accessed (referred to as "MCLK"), and the rate at which the image data are clocked out of the display pipe is determined by the rate at which the graphics display device can accept the image data (referred to as "PCLK").

The clock rates MCLK and PCLK are distinguished from the frequency of the near-empty signal used for triggering memory accesses or fetches. Where the image data corresponding to a particular display pipe are required relatively infrequently, the near-empty signal is likewise generated relatively infrequently. Where there are multiple display pipes or paths, the display pipes are typically not selected with the same frequency, and are therefore not emptied with the same frequency, even though they are emptied at the same rate. The bandwidth of a given one of the display pipes is therefore a function of both the frequency of occurrence of the near-empty signal and the rate at which data are output from the pipe. Particularly, the bandwidth is proportional to the product of this frequency and this rate.

The clock rate for memory fetches must at least be high enough to keep up with the requirements of all the display pipes; otherwise, one or more display pipes will be starved of data. This starvation will result in the appearance of an undesirable artifact on the display. To ensure that starvation does not occur, MCLK is set high enough to service all of the pipes under the worst case condition that all of the pipes require refilling at the same time.

In many graphics display systems, it is also desirable to decrease power consumption. This is particularly so in portable, battery powered systems such as cellular telephones. And in general, power consumption is greater, the greater the clock rate.

Accordingly, there is a need for a method and apparatus for adaptively adjusting the bandwidth of a data transmission channel having multiple paths that provides for optimizing the bandwidth to reduce power consumption.

SUMMARY

According to the invention, a method and apparatus for adaptively adjusting the bandwidth of a data transmission channel having multiple buffered paths is disclosed. Each output path includes a buffer for holding respective portions of the data. A value representative of at least the number of said buffers that are nearly empty of data as compared to a threshold is determined, and the transmission rate of the input path is adjusted according to said value. Preferably, the value is determined dynamically as the number of buffers that are empty of data change over time. In addition, the buffers are preferably display pipes provided in a graphics controller chip for interfacing between one or more hosts and a graphics display device.

It is to be understood that this summary is provided as a means of generally determining what follows in the drawings and detailed description and is not intended to limit the scope of the invention. Objects, features and advantages of the invention will be readily understood upon consideration of the following detailed description taken in conjunction with the accompanying drawings.

DETAILED DESCRIPTION OF PREFERRED EMBODIMENTS

Figure 1:
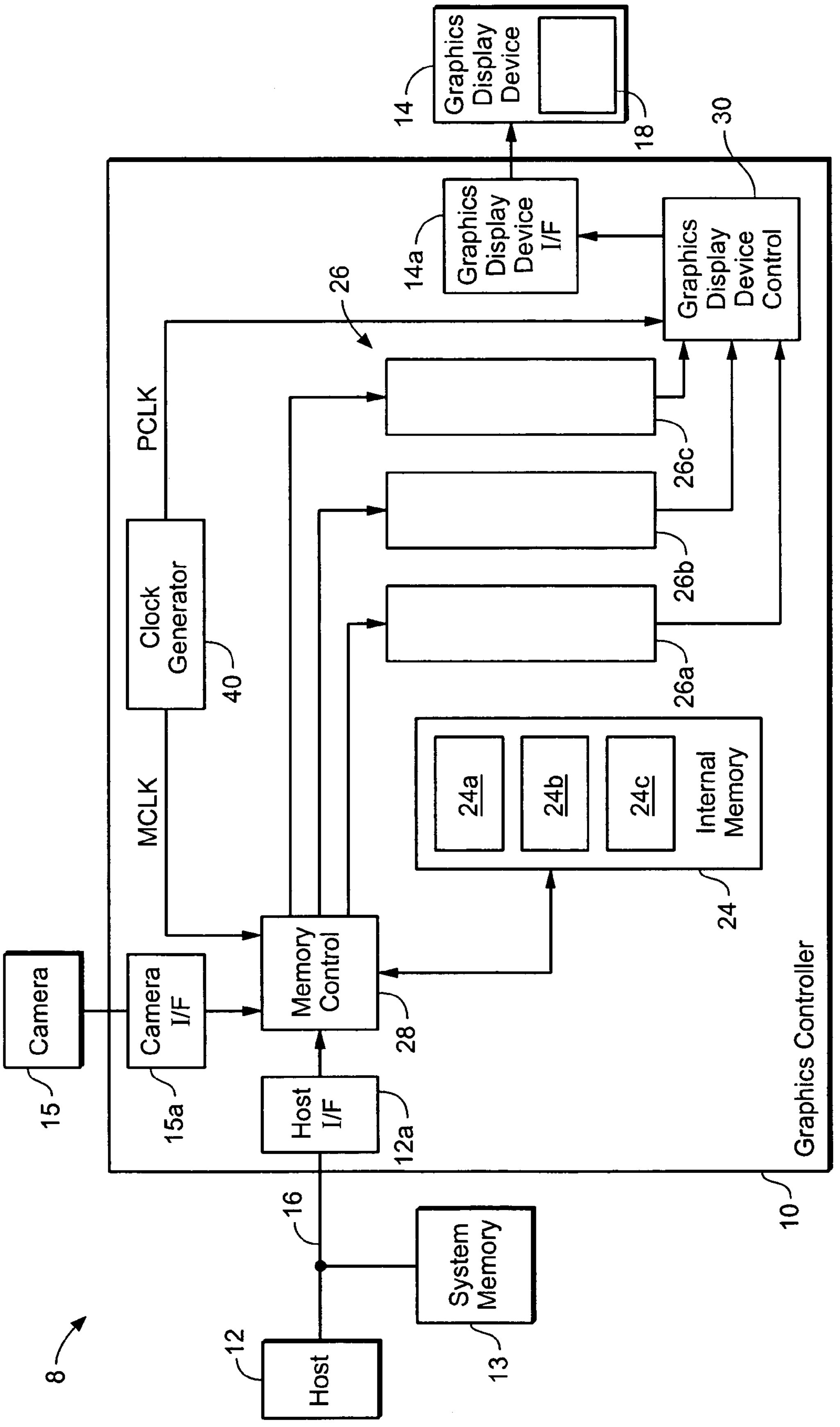
FIG. 1 is a block diagram of a system according to the invention comprising a host, a graphics controller according to the invention, and a graphics display device.

As mentioned above, the invention relates to a method and apparatus for adaptively adjusting the bandwidth of a data transmission channel having multiple buffered paths. Reference will now be made in detail to the present preferred embodiments of the invention, examples of which are illustrated in the accompanying drawings. Wherever possible, the same reference numbers are used in the drawings and the description to refer to the same or like parts.

Referring to FIG. 1, a system 8 including a graphics controller 10 according to the invention is shown. The system 8 may be any digital system or appliance providing graphics output, but the graphics controller 10 is particularly advantageous for use in a portable appliance that is powered by a battery (not shown), where reduced power consumption is particularly important. The preferred system 8 is a mobile telephone.

The system 8 includes a primary host 12 and a graphics display device 14, and the graphics controller interfaces between the host and the display device. The graphics controller is typically and preferably a single IC separate from the host and separate from the display device 14.

The host 12 is preferably a microprocessor, but may be a computer or any other provider of image data. The system 8 typically has an associated system memory 13.

The system also typically, though not necessarily, includes a secondary host or camera 15 that also provides image data to the graphics controller 10. An asynchronous camera interface 15*a* is employed to provide image data from the camera 15 to the graphics controller 10.

The graphics controller 10 receives data and instructions output from the host 12 onto a bus 16 through a host I/F 12*a*. The bus 16 may be serial or parallel, and may be organized to transmit the data and instructions over the same line(s) or over separate line(s) of the bus.

The graphics controller 10 includes an internal memory 24 and a memory controller 28. Image data are provided by the host 12 and the camera 15 to the memory controller, which stores the data in the internal memory.

Figure 2:
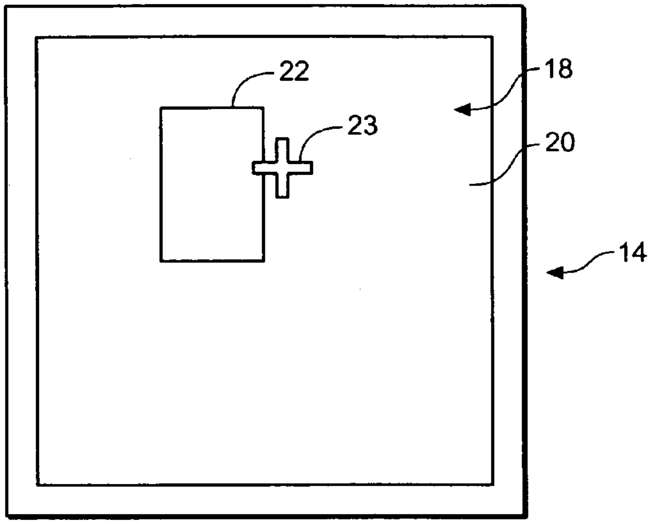
FIG. 2 is a pictorial view of the display area of a graphics display device showing a main window, a sub-window, and a sprite.

FIG. 2 shows the graphics display device 14 in greater detail. The graphics display device 14 is adapted for displaying pixels of image data on a display area 18 of the device. Especially for use in cellular or mobile telephones, the display device 14 is preferably an LCD panel, but any device(s) capable of rendering pixel data in visually perceivable form may be employed, such as CRT, LED, OLED, and plasma, without regard to the particular display technology employed. The display device may also be a hard-copy device, such as a printer or plotter.

The pixels originate from the host 12, or the camera 15, and are transmitted to the display device through the graphics controller 10.

Image data may be displayed on the display device 14 within windows, each window defining, typically, a rectangular area within the display area 18. Image data corresponding to a window populate the window. There may be, and often are, more image data corresponding to a window than can be seen in the window.

Often the system provides for displaying image data corresponding to a larger "main" window 20 within which may be displayed image data corresponding to a smaller "sub-window" 22. The sub-window typically overlays the main window. The system also typically provides a "sprite" 23. Typically, the sprite overlays any and all main windows and sub-windows. Any number of main windows, sub-windows, or sprites (collectively "windows") may be provided.

Referring back to FIG. 1, the internal memory 24 typically includes, for storing image data corresponding to the three windows described above, a storage region 24*a* for storing image data corresponding to a main window, a storage region 24*b* for storing image data corresponding to a sub-window, and a storage region 24*c* for storing image data corresponding to a sprite. The memory controller 28 writes the data to the appropriate storage region of the memory 24.

The graphics controller 10 includes a data transmission channel having at least one input path and at least two output paths. For illustrative purposes, the system 8 is described with a single input path from the memory controller 28, it being understood that with suitable modification additional input paths may be provided without departing from the principles of the invention.

Preferably, three parallel output paths, more particularly three display pipes 26 corresponding to the three windows, are provided for transferring the image data from the memory 24 to the graphics display device 14. Particularly, data from the main storage region 24*a* are fetched and input to a main window pipe 26*a*, data from the sub-window storage region 24*b* are fetched and input to a sub-window pipe 26*b*, and data from the sprite storage region 24*c* are fetched and input to a sprite pipe 26*c*. Typically, the host 12 provides the main image data and the sprite data, and either the camera 15 or the host 12 provides the sub-window image data, though this is not essential. Additional windows and additional pipes for transmitting or propagating image data associated with the additional windows may also be provided. The display pipes are preferably dual-port FIFO memories, but this is not essential to the invention and the display pipes may be, for example, a random access memory provided alone or in conjunction with a suitable controller.

The image data are fetched from the internal memory 24 and written to the display pipes 26 by the memory controller 28 at a clock rate MCLK. In turn, image data are fetched from the pipes 26 and transmitted over the display device interface 14*a* to the graphics display device 14 by a graphics display device control module 30 at a clock rate PCLK. The clock rate PCLK is typically substantially lower than the clock rate MCLK.

The graphics display device control module 30 selects image data from one of the pipes for transmission to the display device. Such a selection is necessary when there are image data available from more than one pipe that correspond to the same pixel on the display device. In that case, image data available from a pipe corresponding to a window having priority "overlay" image data available from a pipe corresponding to all other windows having lesser priority. For example, it is typically desired to overlay sub-window image data over main window image data and to overlay sprite image data over either sub-window image data or main window image data. By overlaying image data, only the image data corresponding to the window having priority are displayed. Window priority is typically either assumed or specified by the host.

Fetching all of the image data corresponding to all of the windows and then selecting only the image data having priority is less than optimally efficient; however, it is standard practice and therefore exemplary. It should be understood that the invention may be used in accordance with any scheme or methodology for increasing the efficiency of data transfer through the system.

Figure 3:
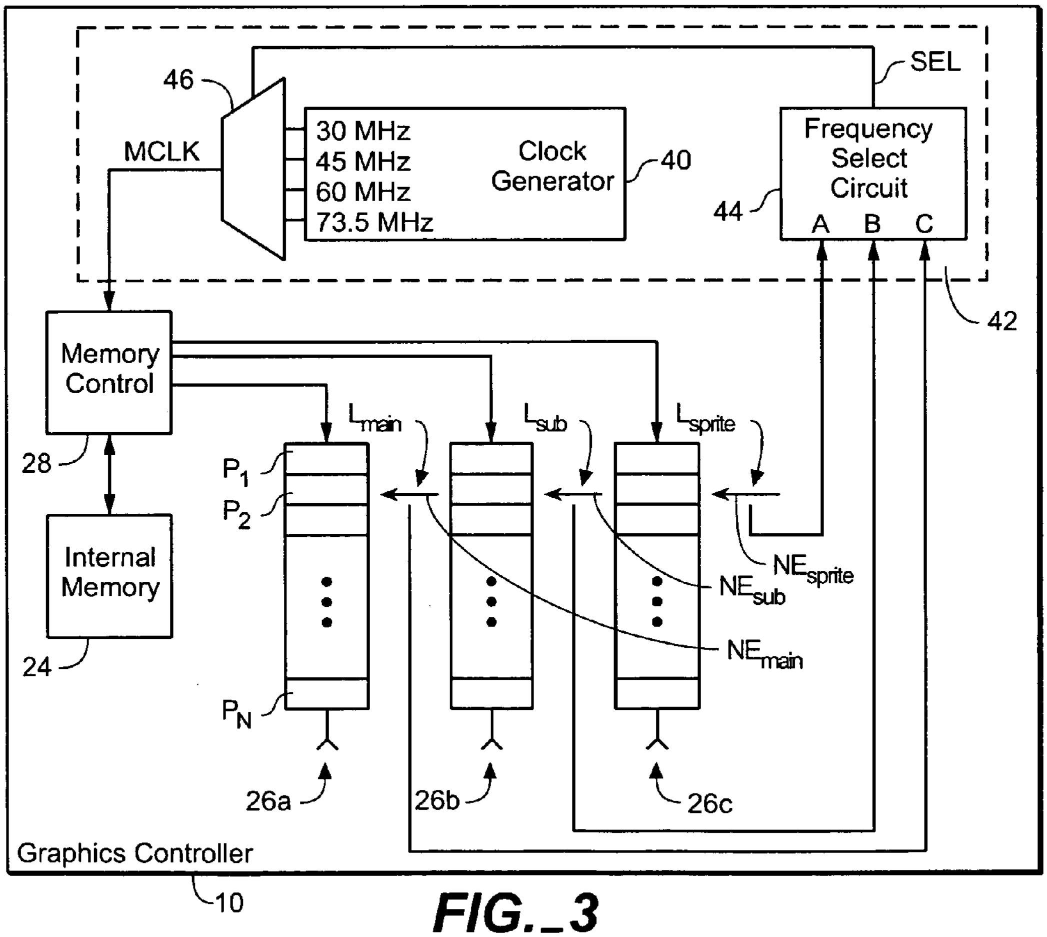
FIG. 3 is a block diagram of the graphics controller of FIG. 1 showing an adaptive bandwidth control circuit according to the invention.

FIG. 3 shows the graphics controller 10 in selected detail. Each of the display pipes 26 temporarily stores, or holds, image data, and thereby acts as a buffer. This buffering function permits data to be written to the display pipes from the memory 24 in relatively fast and efficient bursts, notwithstanding that the data are output from the display pipes at a slower, steady rate.

Each display pipe has associated therewith a level indicator L; more particularly a level indicator $L_{main}$ is associated with the display pipe 26*a*; a level indicator $L_{sub}$ is associated with the display pipe 26*b*; and a level indicator $L_{sprite}$ is associated with the display pipe 26*c*. The level indicators indicate the number of pixels of data remaining in the associated display pipes. For example, the display pipe 26*a* includes storage space for pixels $P_1$, $P_2$, . . . $P_N$.

"Upon start-up of the graphics controller 10, the memory controller 28 will fill the display pipes 26, including the display pipe 26*a*, with image data. For example, if N equals 64, the display pipe 26*a* will contain 64 pixels of image data. Thereafter, data will be output from the display pipe 26*a* according to demand, which cannot in general be predicted. The image data level in the pipe will first fall, and thereafter rise and fall according to the rate and frequency at which image data are written to the pipe and the rate and frequency at which image data are withdrawn from the pipe."

The level indicators may keep track of the data remaining in the associated pipes simply by counting, i.e., summing the data input and subtracting the data output. The level indicators may therefore be implemented as increment/decrement modules. However, the level indicators may be implemented in alternative ways, including ways that do not provide the precision of counting each pixel of data. For example, the level indicators may indicate whether the pipe level exceeds (or does not exceed) a limited number of levels, such as 25%, 50% and 75%. In simplest form, the level indicators may simply indicate that a single level has been reached. For example, a level indicator according to the invention may provide an indication only when the associated pipe is nearly empty, e.g., the level declines to 20%. Such an indication is referred to herein as a "near-empty flag" or "NE flag." For the three display pipes described above, three corresponding NE flags may be provided, namely, $NE_{main}$, $NE_{sub}$, and $NE_{sprite}$.

As discussed above, the clock generator 40 generates two types of clock signals. The clock generator circuit generates a clock signal MCLK for clocking the memory controller 28 and thereby controlling the rate at which data are fetched and input to the display pipes, and also generates a clock signal PCLK that determines the rate at which data are output from the display pipe to the graphics display device. The clock signal PCLK is determined so as to be compatible with the graphics display device.

However, according to the present invention, an adaptive bandwidth adjustment circuit 42 is provided including a clock generator 40 that, in contrast to the prior art, produces a number of alternative clock signals for use as the signal MCLK, each having a different frequency. The circuit 42 also includes a select circuit 44 that receives the values of the level indicators L as inputs "A," "B," and "C." The frequency select circuit 44 outputs a select signal SEL that may be used to control a multiplexer 46 for selecting the desired clock signal. Other frequency selection or control methods may be used; for example, the signal SEL may be used to control a phase locked loop.

Where the level indicators L merely indicate whether the display pipe is nearly empty or not by use of NE flags, the inputs A, B and C are either "high" or "low." The frequency select circuit 44 may produce a unique output for any value of ABC. As one illustrative example, the frequency select circuit 44 sums the flags for all of the pipes and produces an output or value according to the truth table below:

TABLE 1

| NEmain | NEsub | NEsprite | Sum | MCLK Select |
|---|---|---|---|---|
| 0 | 0 | 0 | 0 | 30 MHz |
| 0 | 0 | 1 | 1 | 45 MHz |
| 0 | 1 | 0 | 1 | 45 MHz |
| 0 | 1 | 1 | 2 | 60 MHz |
| 1 | 0 | 0 | 1 | 45 MHz |
| 1 | 0 | 1 | 2 | 60 MHz |
| 1 | 1 | 0 | 2 | 60 MHz |
| 1 | 1 | 1 | 3 | 73.5 MHz |

In this example, a simple sum of simple binary level indications is used to select from among the alternative clock frequencies 30, 45, 60, and 73.5 MHz, providing the outstanding advantage of dynamically adapting the MCLK frequency to provide the amount of bandwidth needed under different circumstances. For example, when the graphics controller 10 is first powered up, all of the display pipes 26 will be empty. At that time, all of the NE flags will be set at 1 and the circuit 42 will select the highest clock frequency for the clock signal MCLK (e.g., 73.5 MHz) to fill the pipes. Once the pipes are all filled, all of the NE flags will be set to 0 and the circuit 42 will select the lowest clock frequency for MCLK (e.g., 30 MHz). This lower clock frequency reduces power consumption to a desired minimum. Thereafter, as the display pipes are emptied at different frequencies, the NE flags for different combinations of the pipes will be set back to 1 at particular times at which an optimum intermediate frequency for MCLK can be used.

The truth table shown in FIG. 1 could easily be modified to take account of the identity of the pipes in addition to their number, and thereby produce a value that is unique for the particular combinations of NE flags. This may be advantageous where image data corresponding to a particular pipe are critical, or are more important than image data corresponding to other pipes. In that case, some starvation may be acceptable in the less critical data path, or the degree to which the clock speed is adjusted may be made to depend on the identity of the pipe that is nearly empty.

In general, the level indicators L may indicate the data level in a display pipe to any precision up to and including a precision equal to a single pixel. It will be readily appreciated that the output of the frequency select circuit 44 could be more highly tuned where precision is increased.

As will be readily appreciated, as an alternative to adjusting the clock rate MCLK for clocking the memory 24, the bandwidth of the data transmission channel through the graphics controller may be adjusted by adjusting the width of the input path, which in the example is the bus 16. For instance, a 24-bit parallel bus may be provided and bandwidth may be adjusted by alternately employing 8, 16, or 24 bits of the bus.

It is to be recognized that, while a particular method and apparatus for adaptively adjusting the bandwidth of a data transmission channel having multiple buffered paths has been shown and described as preferred, other configurations and methods could be utilized, in addition to those already mentioned, without departing from the principles of the invention. For example, while described in the context of a preferred, graphics system 8, the invention may be used in other types of systems and may employ other types of buffered paths in addition to electronic buffers, such as optical or acoustic buffers. The invention may also use input paths that bypass a memory such as the memory 24. For example, data could be input to the graphics controller from a host which writes directly to the display pipes. The invention is believed to have wide applicability.

It should be understood that, while preferably implemented in hardware, the invention may be implemented in a combination of hardware and software, or only in software, provided the graphics controller is suitably adapted. For example, a program of instructions stored in a machine readable medium may be provided for execution by an embedded processor included in the graphics controller.

The terms and expressions which have been employed in the foregoing specification are used therein as terms of description and not of limitation, and there is no intention in the use of such terms and expressions to exclude equivalents of the features shown and described or portions thereof, it being recognized that the scope of the invention is defined and limited only by the claims which follow.

The invention claimed is:

1. A method for adaptively adjusting the bandwidth of a pixel data transmission channel having an input path and a plurality of parallel output paths, each output path including a buffer to hold respective portions of the pixel data, wherein pixel data are input to the input path at one of at least two alternative clock frequencies, the method comprising:

determining a value representative of two or more of the buffers that contain an amount of pixel data which is less than a threshold, wherein each of the buffers provide a flag whenever the level of pixel data in a buffer is less than the threshold, the threshold corresponding with at least two pixel datum; and adjusting the transmission rate of the input path according to the representative value, the adjusting of the transmission rate being sudden and including selecting one of the alternative clock frequencies, the selected clock frequency being distinct from a current clock frequency, wherein the difference between each of the alternative clock frequencies is greater than one percent.

2. The method of claim 1, wherein the alternative clock frequencies include a maximum clock frequency, and the adjusting of the transmission rate includes selecting the maximum clock frequency if the representative value is a maximum representative value in order to prevent any of the buffers from becoming empty of pixel data.

3. The method of claim 2, wherein the alternative clock frequencies include second, third, and fourth clock frequencies, the second clock frequency being substantially eighty percent of the maximum clock frequency, the third clock frequency being substantially sixty percent of the maximum clock frequency, and the fourth clock frequency being substantially 40 percent of the maximum clock frequency.

4. The method of claim 3, wherein the step of determining a value includes summing the flags.

5. The method of claim 3, wherein the clock rate at which a memory is accessed is the selected clock frequency further, comprising fetching the pixel data for input to the buffers from the memory according to the selected clock frequency.

6. The method of claim 3, wherein the step of adjusting the transmission rate includes selecting one of the second, third, and forth clock frequencies whenever the value decreases from a previously determined value in order to reduce power consumption.

7. The method of claim 3, wherein the method is embodied on a computer-readable storage medium as a program of instructions, the instructions being executable by a machine to perform the method.

8. The method of claim 4 wherein the summing of the flags takes into account the identity of the respective buffers providing a flag.

9. The method of claim 1, wherein the step determining a value includes summing the flags.

10. The method of claim 1, wherein the method is embodied on a computer-readable storage medium as a program of instructions, the instructions being executable by a machine to perform the method.

11. A circuit for transmitting pixel data, the circuit comprising:

a pixel data transmission channel having an input path and a plurality of parallel output paths, each output path including a buffer to hold respective portions of the pixel data, each of the buffers providing a flag whenever the level of pixel data in the buffer has reached a particular non-empty threshold level, wherein pixel data are input to the input path at one of a plurality of alternative clock frequencies;

a clock generator to generate the alternative clock frequencies; and a frequency selecting circuit to select one of one of the alternative clock frequencies according to a value representative of the number of the buffers providing the flag, the selected clock frequency being selected substantially simultaneously with a change in the number of buffers providing the flag.

12. The circuit of claim 11, wherein the difference between each of the alternative clock frequencies is greater than one percent, and the alternative clock frequencies include first, second, third, and fourth clock frequencies, the second clock frequency being substantially eighty percent of the first clock frequency, the third clock frequency being substantially sixty percent of the first clock frequency, and the fourth clock frequency being substantially 40 percent of the first clock frequency.

13. The circuit of claim 12, wherein the value is determined by summing the flags.

14. The circuit of claim 12, wherein the frequency selecting circuit selects a clock frequency that is lower than a previously selected clock frequency whenever the representative value decreases from a previously determined representative value in order to reduce power consumption.

15. The circuit of claim 12, wherein the frequency selecting circuit selects a clock frequency that is higher than a previously selected clock frequency whenever the representative value increases from a previously determined representative value in order to prevent any of the buffers from becoming empty of pixel data.

16. The circuit of claim 11, further comprising a memory, wherein the selected clock frequency is the clock frequency at which the memory is accessed, and the circuit transfers pixel data stored in the memory to the buffers at the selected clock frequency.

17. A system, comprising a graphics controller that includes:

a memory to store data, the memory being accessed at one of a plurality of alternative clock frequencies;

a transmission channel having a data input path and a plurality of data output paths, each data output path including a buffer to hold respective portions of the data, each buffer providing n indicator of the level of data in the buffer, wherein pixel data are input to the input path at one of the alternative clock frequencies whenever one or more of the indicators indicates that the level of data in a buffer is below a threshold, the threshold corresponding with non-zero level of data;

a clock generator to generate the alternative clock frequencies; and a frequency selecting circuit to select one of the clock frequencies according to a value representative of the data levels of two or more of the buffers, wherein the representative value is determined by summing the number of buffers which indicate a data level lower than the threshold, and the selected one of the clock frequencies is selected substantially suddenly following a change in the number of buffers indicating a data level lower than the threshold.

18. The system of claim 17, further comprising a host and a display device.

19. The system of claim 18, wherein the graphics controller is incorporated on an integrated circuit that is separate from the host and the graphics display device.

20. The system of claim 17, wherein the difference between each of the alternative clock frequencies is at least one percent, and the frequency selecting circuit selects a clock frequency which is a minimum clock frequency if the data levels of all of the plurality of buffers is greater than the threshold in order to reduce power consumption.

21. The system of claim 17, wherein the difference between each of the alternative clock frequencies is at least one percent, and the frequency selecting circuit selects a clock frequency which is a maximum clock frequency if the data levels of all of the plurality of buffers is less than the threshold in order to prevent any of the buffers from becoming empty of data.

22. The system of claim 17, wherein the difference between each of the alternative clock frequencies is at least one percent, and the alternative clock frequency include first, second, third and fourth clock frequencies, the second clock frequency being substantially eighty percent of the first clock frequency, the third clock frequency being substantially sixty percent of the first clock frequency, and the fourth clock frequency being substantially 40 percent of the first clock frequency.

* * * * *